(12) United States Patent
Malegaonkar et al.

(10) Patent No.: US 8,532,994 B2
(45) Date of Patent: Sep. 10, 2013

(54) SPEECH RECOGNITION USING A PERSONAL VOCABULARY AND LANGUAGE MODEL

(75) Inventors: Ashutosh A. Malegaonkar, Milpitas, CA (US); Gannu Satish Kumar, San Jose, CA (US); Guido K. M. Jouret, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 12/870,480

(22) Filed: Aug. 27, 2010

(65) Prior Publication Data

US 2012/0053935 A1   Mar. 1, 2012

(51) Int. Cl.
G10L 15/00 (2006.01)
G10L 15/18 (2006.01)
G10L 21/00 (2006.01)
G06F 17/27 (2006.01)

(52) U.S. Cl.
USPC .............................. 704/257; 704/9; 704/270

(58) Field of Classification Search
USPC ........................ 704/9, 231–257, 270, 270.1
See application file for complete search history.

(56) References Cited

U.S. PATENT DOCUMENTS

| | | | |
|---|---|---|---|
| 5,905,773 A | 5/1999 | Wong | |
| 6,418,431 B1 * | 7/2002 | Mahajan et al. | 1/1 |
| 6,510,414 B1 | 1/2003 | Chaves | |
| 7,031,908 B1 * | 4/2006 | Huang et al. | 704/9 |
| 7,689,415 B1 | 3/2010 | Jochumson | |
| 7,774,197 B1 * | 8/2010 | Bulyko | 704/9 |
| 2007/0124134 A1 * | 5/2007 | Van Kommer | 704/10 |
| 2007/0153989 A1 | 7/2007 | Howell | |
| 2008/0004877 A1 * | 1/2008 | Tian | 704/251 |
| 2008/0221897 A1 * | 9/2008 | Cerra et al. | 704/270.1 |
| 2008/0319758 A1 * | 12/2008 | Da Palma et al. | 704/270.1 |
| 2009/0204392 A1 | 8/2009 | Ishikawa | |
| 2009/0228270 A1 * | 9/2009 | Odell et al. | 704/231 |
| 2010/0083287 A1 * | 4/2010 | Maximilien et al. | 719/328 |

FOREIGN PATENT DOCUMENTS

| | | |
|---|---|---|
| EP | 1 791 114 A1 | 5/2007 |
| WO | WO 01/26093 A1 | 4/2001 |

OTHER PUBLICATIONS

Hazen, T., et al., "Recognition Confidence Scoring for Use in Speech Understanding Systems," *Computer Speech and Language*, 16(1):49-67 (Jan. 2002).

Hakkani-Tür, D., et al., "Error Prediction in Spoken Dialog: From Signal-To-Noise Ratio to Semantic Confidence Scores," *IEEE* (2005).

International Search Report in PCT Application No. PCT/US2011/047009 dated Oct. 18, 2011.

International Preliminary Report on Patentability and Written Opinion from corresponding International application No. PCT/US2011/047009, 8pgs., Mar. 5, 2013.

* cited by examiner

*Primary Examiner* — Jesse Pullias
(74) *Attorney, Agent, or Firm* — Brinks Hofer Gilson & Lione

(57) ABSTRACT

In one implementation, speech or audio is converted to a searchable format by a speech recognition system. The speech recognition system uses a language model including probabilities of certain words occurring, which may depend on the occurrence of other words or sequences of words. The language model is partially built from personal vocabularies. Personal vocabularies are determined by known text from network traffic, including emails and Internet postings. The speech recognition system may incorporate the personal vocabulary of one user into the language model of another user based on a connection between the two users. The connection may be triggered by an email, a phone call, or an interaction in a social networking service. The speech recognition system may remove or add personal vocabularies to the language model based on a calculated confidence score from the resulting language model.

20 Claims, 7 Drawing Sheets

US 8,532,994 B2

SPEECH RECOGNITION USING A PERSONAL VOCABULARY AND LANGUAGE MODEL

FIELD

The present embodiments relate to speech recognition or speech to text.

BACKGROUND

The amount of information available on the Internet has grown exponentially. This content can be effectively consumed only through the use of search engines. A growing proportion of content is speech or audio that cannot readily be searched. Speech recognition converts spoken words to text, which allows speech or audio to be searched using search engines.

Speech recognition software development began in the 1980s. Early speech recognition software could recognize words spoken one at a time from a limited vocabulary. The vocabularies could be easily increased but high vocabulary systems were plagued with accuracies under 50% into the early 1990s, rendering most systems practically unusable. The first commercial product to recognize normally spoken continuous speech was released in 1997. The largest improvements in speech recognition software did not come through new developments in speech recognition technique. Instead, the improvements were a result of the increases in computing power and data storage coupled with lowered costs. However, the accuracy rate of commercial products has reached a plateau around 70-80%. Further, attempts to list all possible words in all languages have resulted in one trillion word vocabularies. However, additional, significant increases in recognition accuracy may not be provided by larger vocabularies or increases in computing power or data storage.

DETAILED DESCRIPTION

Overview

Figure 1:
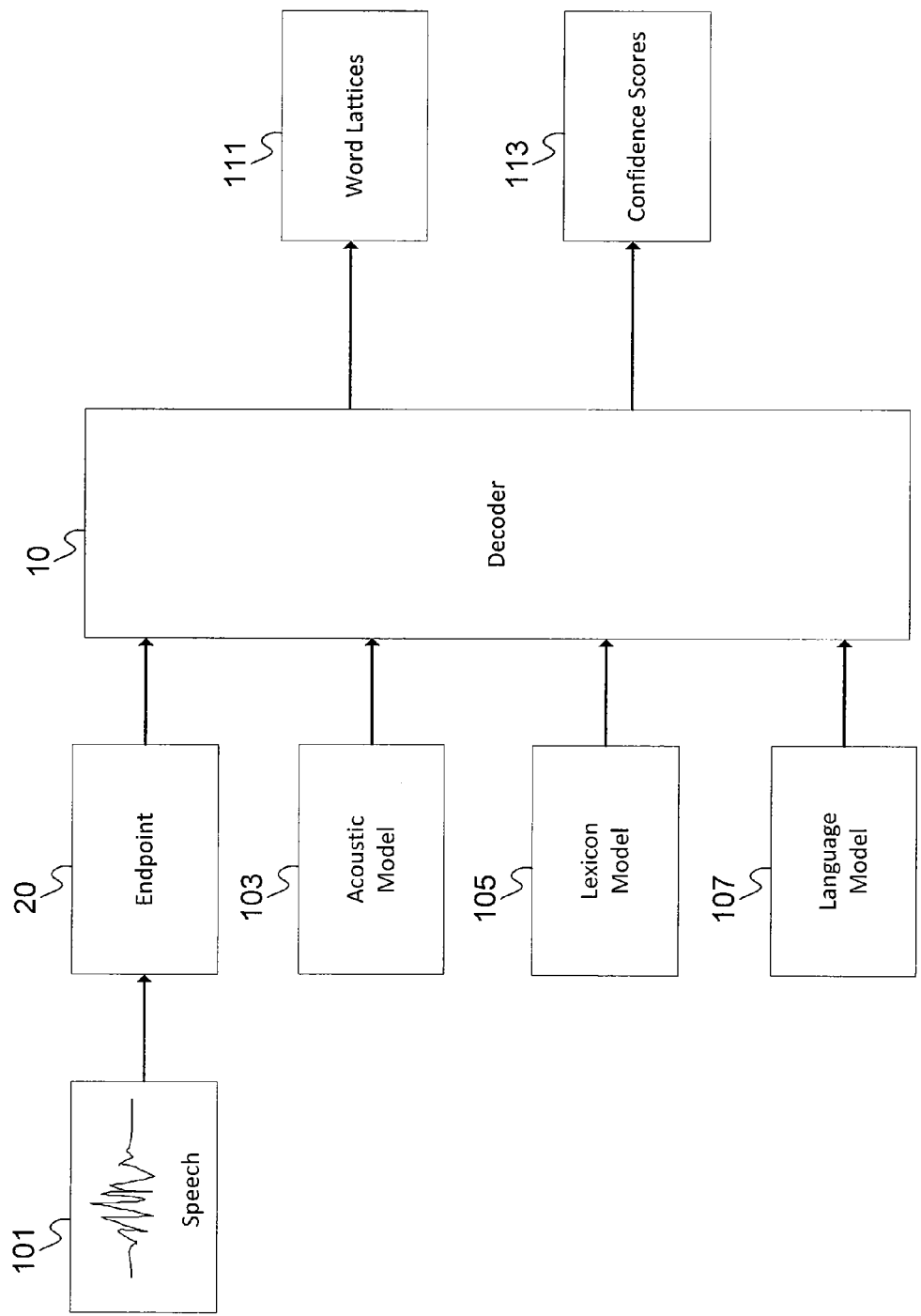
FIG. 1 illustrates an embodiment of a speech recognition system.

Speech recognition systems convert speech or audio into text that can be searched. Speech recognition systems use language models which may be specialized to a particular profession. An improved language model may be tailored to a particular individual using the vocabulary of the individual and the vocabularies of others in the individual's social graph. Automatically and continuously building language models based on text from a user and/or the user's peers improves the accuracy of speech transcripts. For example, peers may be identified from emails or social networking contacts, and the language models may be built from emails, hypertext transfer protocol (HTTP) postings, or any network traffic associated with the peers or the user.

In one aspect, a method includes monitoring network traffic from a plurality of users including a first user and a second user; extracting words from the network traffic; building a personal vocabulary for each of the plurality of users; and converting audio of the first user into text using a language model based at least partially on the personal vocabulary of the second user.

In a second aspect, an apparatus includes a collector interface configured to monitor network traffic from a plurality of users including a first user and a second user and extract n-grams from the network traffic; a memory configured to store a personal vocabulary for each of the plurality of users; and a controller configured to convert audio of the first user into text using a language model based at least partially on the personal vocabulary of the second user.

In a third aspect, logic encoded in one or more non-transitory tangible media is executable by a processor and operable to monitor network traffic from a plurality of users including a first user and a second user; extract words from the network traffic; build a personal vocabulary from the words for each of the plurality of users; convert audio of the first user into text using a first language model based on the personal vocabulary of the first user; calculate a confidence score of the text using the first language model; compare the confidence score to a predetermined threshold; and convert, if the confidence score does not exceed the predetermined threshold, audio of the first user into text using a second language model based on the personal vocabulary of the first user and the personal vocabulary of the second user.

Example Embodiments

Increases in recognition accuracy by simply building larger vocabularies or increasing the computing power of the speech recognition system may not be significant. In fact, in many cases, adding words to a one size fits all vocabulary actually tends to decrease the recognition accuracy of the speech recognition system. As the number of words to choose from increases, so too may the probability of choosing the wrong word. To improve, speech recognition systems must become smarter by reducing the size of the vocabulary while increasing the accuracy of the conversion from speech to text.

One way to reduce the size of the vocabulary is to personalize the vocabulary of the system. For example, the system could be preloaded with vocabularies designated for certain professions, such as doctors, engineers, lawyers, or bankers. Of course, all doctors do not use the same vocabulary, and a doctor does not always speak about medical topics. Another way to reduce the size of the vocabulary is to personalize the vocabulary to a particular individual. For example, by intelligently harvesting network data from a variety of end users, a personal vocabulary can be created by observing each user's interaction/traffic on the network.

The network traffic includes a variety of communication from the end user. For example, network data may be included in an email, an HTTP transaction, a document (e.g., Word or PDF), a text message, an instant message, a blog posting, etc. In addition, the recognition system may evaluate if the end user represents the producer of the content (e.g., the sender, the poster, etc.), or the consumer of the content (e.g., the recipient, the audience member, etc.) in weighting the language model.

A personal vocabulary created from the network traffic of one user is limited by the particular user's habits. For example, if a user rarely produces or consumes content, the personal vocabulary is not developed. However, people generally have similar vocabularies to the people around them. Further improvements may result from a personal vocabulary for the user that is partially based on the network traffic of other users having some connection to the user. In other words, a personal vocabulary for a user based on one or more other users' network traffic or personal vocabularies may selectively decrease the size of the personal vocabulary or better focus the vocabulary, increasing the accuracy of recognition.

FIG. 1 illustrates an embodiment of a speech recognition system. Speech 101 is received at one or more endpoints 20. A decoder 10 receives inputs from an acoustic model 103, a lexicon model 105, and a language model 107 to decode the speech. The decoder 10 coverts the speech 101 into text, which is output as word lattices 101. The decoder 10 may also calculate confidence scores 113, which may also be confidence intervals.

The speech 101 may be an analog signal. The analog signal may be encoded at different sampling rates (i.e. samples per second—the most common being: 8 kHz, 16 kHz, 32 kHz, 44.1 kHz, 48 kHz and 96 kHz) and/or different bits per sample (the most common being: 8-bits, 16-bits or 32-bits). Speech recognition systems may be improved if the acoustic model was created with audio which was recorded at the same sampling rate/bits per sample as the speech being recognized.

One or more of the acoustic model 103, the lexicon model 105, and the language model 107 may be stored within the decoder 10 or received from an external database. The acoustic model 103 may be created from a statistical analysis of speech and human developed transcriptions. The statistical analysis involves the sounds that make up each word. The acoustic model 103 may be created from a procedure called "training." In training, the user speaks specified words to the speech recognition system. The acoustic model 103 is optional.

The lexicon model 105 is a pronunciation vocabulary. For example, there are different ways that the same word may be pronounced. For example, the word "car" is pronounced differently in the New England states that the rest of the United States. The speech recognition system identifies the various pronunciations using the lexicon model 105. The lexicon model 105 is optional.

The language model 107 defines the probability of a word occurring in a sentence. For example, the speech recognition system may identify speech as either "resident" or "president," with each possibility having equal likelihood. However, if the subsequent word is recognized as "Obama," the language model 107 indicates that there is a much higher probability that the earlier word was "president." The language model 107 may be built from textual data. The language model 107 may include a probability distribution of a sequence of words. The probability distribution may be a conditional probability (i.e., the probability of one word given another has occurred).

For example, the language model approach is part of the stochastic speech recognition formalism to determine a word sequence from its acoustic observations by way of maximizing the posterior probability $P(w1 \ldots wM)P(x1 \ldots xT|w1 \ldots wM)$ over the words $w1 \ldots wM$. The factorized probability $P(x1 \ldots xT|w1 \ldots wM)$ denotes the conditional probability given the word sequence while observing the acoustic features $x1 \ldots xT$. The function $P(w1 \ldots wM)$ refers to the prior probability given a word sequence $w1 \ldots wM$. The distribution describes the language by considering its syntactic, semantic and pragmatic composition and can be constraint to dedicated domains and tasks. A purpose of language modeling is to estimate the prior probabilities $P(w1 \ldots wM)$.

The probability distribution may be calculated from n-gram frequency counts. An n-gram is a sequence of n items from another sequence. In this case, the n-grams may be a sequence of words, syllables, phonemes, or phones. A syllable is the phonological building block of a word. A phoneme is an even smaller building block. A phoneme may be defined as the smallest segmental unit of sound employed to differentiate utterances. Thus, a phoneme is a group of slightly different sounds which are all perceived to have the same function by speakers of the language or dialect in question. A phoneme may be a set of phones. A phone is a speech sound, which may be used as the basic unit for speech recognition. A phone may be defined as any speech segment that possesses the distinct physical or perceptual properties.

The n-gram frequency counts used in the language model 107 may be varied by the decoder 10. The value for n may be any integer and may change over time. Example values for n include 1, 2, and 3, which may be referred to as unigram, bigram, and trigram, respectively. An n-gram corpus is a set of n-grams that may be used in building a language model. Consider the phrase, "cat on a hot tin roof." Word based trigrams include "cat on a," "on a hot," "a hot tin," and "hot tin roof." Additional trigrams may include "# cat on" and "tin roof #," where # indicates a blank or punctuation.

Figure 2:
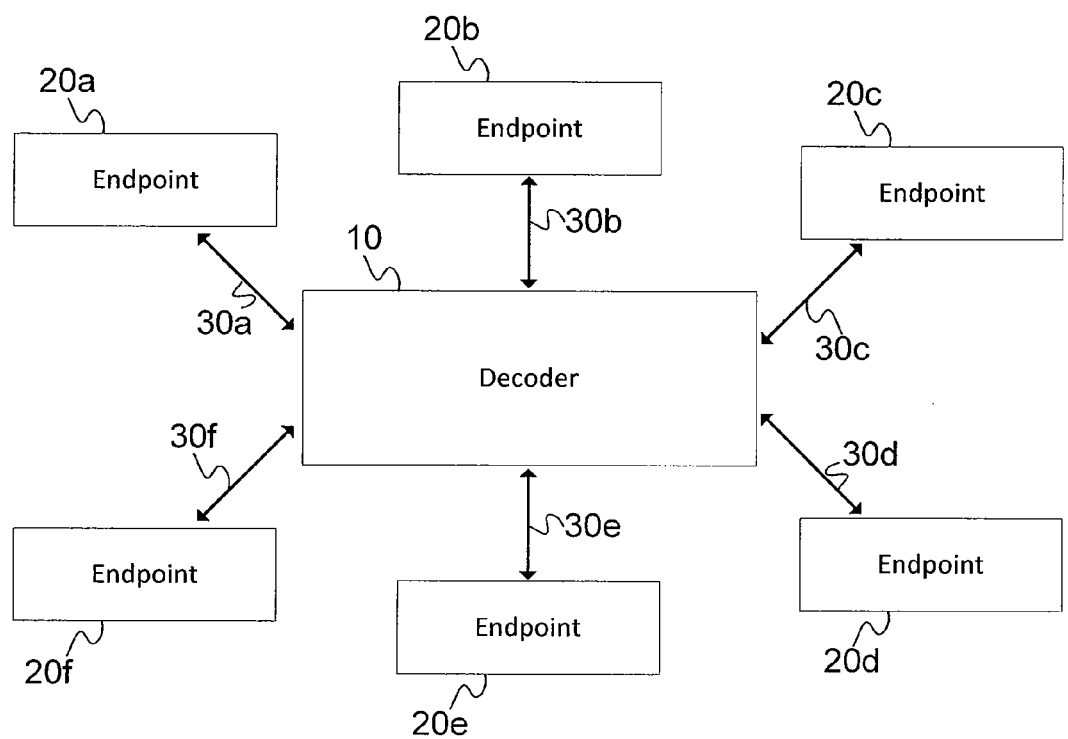
FIG. 2 illustrates a network including the speech recognition system.

FIG. 2 illustrates a network including the speech recognition system. The decoder 10 is in communication with one or more endpoints 20a-f via communication paths 30a-f. The decoder 10 converts audio or speech received from the endpoints 20a-f into text. The speech or audio may be a video that the endpoints 20a-f have uploaded to a network or a website. Once the speech or audio is converted to text, it can be searched. In this way, videos can be located not simply from searching the title, keywords, or summary, but by searching the actual content of the video. Each of the endpoints 20a-f may be a personal computer, VoIP phone, mobile phone, or any device capable of receiving audio or speech and communicating with a network.

The speech or audio may also be a conference (e.g. teleconference or videoconference). The decoder 10 may convert audio or speech from endpoints 20a-f that are participating in the conference. In this way, a transcript of the conference is created that can be text searched, which allows quick reference to particular points or discussions that occurred during the conference. In either case, the controller 13 may use the text of the speech or audio for a folksonomy. A folksonomy is a system for categorizing content using tags. A tag cloud is a visual representation of a folksonomy.

Figure 3:
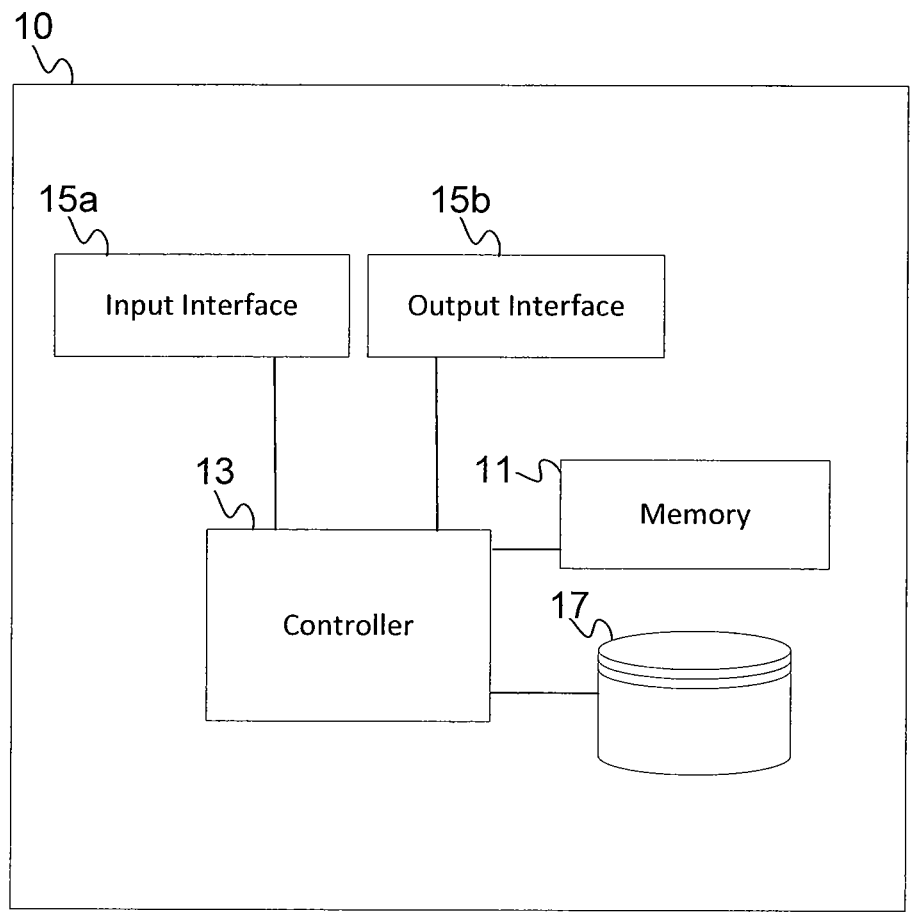
FIG. 3 illustrates a more detailed view of the decoder of the speech recognition system.

FIG. 3 illustrates a more detailed view of the decoder 10 of the speech recognition system. The decoder 10 may be a network appliance. The decoder 10 includes a controller 13, a memory 11, a database 17, and a communications interface, including an input interface 15a and an output interface 15b. The input interface 15a receives speech from the endpoints 20a-f. The output interface 15b may provide the decoded text to an external database or search engine. Alternatively, the decoded text may be stored in database 17. Additional, different, or fewer components may be provided.

One or more of the acoustic model 103, the lexicon model 105, and the language model 107 may be stored in memory 11 or database 17. The memory 11 may be any known type of volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 11 may include an optical, magnetic (hard drive) or any other form of data storage device. The memory 11 may be located in a remote device or removable, such as a secure digital (SD) memory card.

The database 17 may be external to the decoder 10 or incorporated within the decoder 10. The database 17 may be stored with memory 11 or separately. The database 17 may be implemented as either hardware or software.

The memory 11 may store computer executable instructions. The controller 13 may execute computer executable instructions. The computer executable instructions may be included in computer code. The computer code may be stored in the memory 11. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may be logic encoded in one or more tangible media or one or more non-transitory tangible media for execution by the controller 13. Logic encoded in one or more tangible media for execution may be defined as instructions that are executable by the controller 13 and that are provided on the computer-readable storage media, memories, or a combination thereof. Instructions for instructing a network device may be stored on any logic. As used herein, "logic" includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The instructions may be stored on any computer readable medium. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may include a general processor, digital signal processor, application specific integrated circuit, field programmable gate array, analog circuit, digital circuit, server processor, combinations thereof, or other now known or later developed processor. The controller 13 may be a single device or combinations of devices, such as associated with a network or distributed processing. In addition, the controller 13 may implement a Viterbi decoding algorithm for speech recognition, as recognized by one of ordinary skill in the art. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, micro-code or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface(s) 15*a-b* may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. For example, the I/O interface(s) 15*a-b* may include a first communication interface devoted to sending data, packets, or datagrams and a second communication interface devoted to receiving data, packets, or datagrams. Alternatively, the I/O interface(s) 15*a-b* may be implemented using a single communication interface.

Referring to FIG. 2, the communication paths 30*a-f* may be any protocol or physical connection that is used to couple a server to a computer. The communication paths 30*a-f* may utilize Ethernet, wireless, transmission control protocol (TCP), Internet protocol (IP), or multiprotocol label switching (MPLS) technologies. As used herein, the phrases "in communication" and "coupled" are defined to mean directly connected to or indirectly connected through one or more intermediate components. Such intermediate components may include both hardware and software based components.

Figure 4:
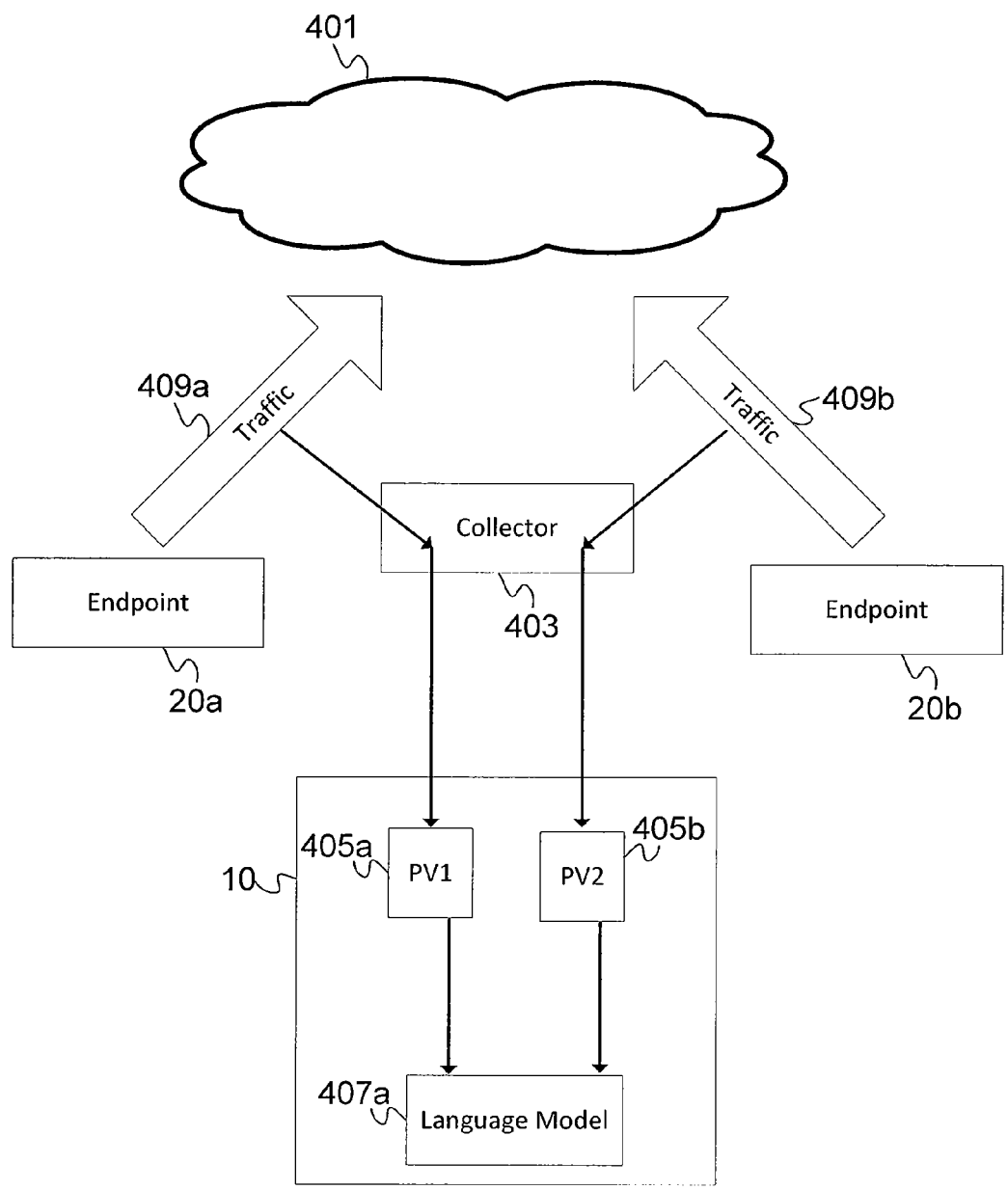
FIG. 4 illustrates a functional block diagram of the operation of the speech recognition system.

FIG. 4 illustrates the operation of the speech recognition system. The endpoints 20*a* and 20*b* sends traffic 409*a* and 409*b* to network 401. The endpoints 20*a* and 20*b* may also receive traffic from the network 401. A collector 403 extracts n-grams from the network traffic. The n-grams may be words, syllables, phonemes, or phones, and n may equal any number. The collector 403 may be incorporated into the network appliance or decoder 10. Alternatively, as shown in FIG. 4, the collector 403 may be external to decoder 10. For example, the collector 403 may be another network appliance. The harvested network traffic may be tagged and categorized to selectively create personal vocabularies from relevant content or all of the harvested network traffic may be used in building personal vocabularies.

The decoder 10 uses the n-grams collected by collector 403 from traffic 409*a* from endpoint 20*a* to build a first personal vocabulary (PV1) 405*a*. Likewise, the decoder 10 uses the n-grams collected by collector 403 from traffic 109*b* from endpoint 20*b* to build a second personal vocabulary (PV2) 405*b*. The decoder may use the first personal vocabulary 405*a*, the second personal vocabulary 405*b*, or both to derive the language model 407*a*. The language model 407*a* is used to convert audio or speech from endpoint 20*a* into text.

The controller 13 of the decoder 10 determines whether to use the first personal vocabulary 405*a*, the second personal vocabulary 405*b*, or both to derive the language model 407*a* based on a connection identified between endpoints 20*a* and 20*b*. The connection could be triggered by an email, a phone call, a social networking contact, or other link.

The email trigger may be an email sent from the first user to the second user, an email sent from the second user to the first user, an email listing the first user and the second user as recipients, an email from a third user listing one of the first user and the second user as a recipient and listing the other of the first user and the second user in a body of the email, and/or an email listing the first user and the second user in a body of the email. Any of these situations may indicate that the first user and the second user have a connection, and the personal vocabulary of one of the users may be incorporated into the language model of the other user.

Likewise, a phone call may trigger a connection. The phone call use a voice over internet protocol (VoIP). For example, if endpoint 20a calls endpoint 20b, the two users have a connection. The two users' personal vocabularies may complement each other's language models. In addition to defining a connection between users, VoIP calls may be analyzed for content. The content of the VoIP call is divided into packets that are forwarding over a network. The packets include speech that may be converted to text by the decoder 10 to identify the subject matter of the call, or alternatively, to create a transcript of the call that may be text searched.

The connections and the vocabulary selected from others may be content based. In addition to initiating the existence of a connection, the emails or content may also be identified by subject matter. For example, consider three users: user A, user B, and user C. User A and user B are both software engineers. Users A and C both enjoy sailing. Emails used to identify a connection between users A and B may have subject matter keywords such as "protocol," "compile" or "code." A later video post or conference involving user A, but not necessarily user B that includes subject matter keywords is identified as related to programming. In this case, the decoder 10 defines a language model based at least partially on the personal vocabulary of user B. In other words, the speech of user A is converted to text based on the personal vocabulary of user B because users A and B have previously engaged in a conversation related to programming.

Likewise, emails used to identify a connection between users A and C may have subject matter keywords such as "buoy," "stern" or "mast." A later video post or conference involving user A, but not necessarily user C, that includes subject matter keywords as related to sailing. In this case, the decoder 10 defines a language model based at least partially on the personal vocabulary of user C. In other words, the speech of user A is converted to text based on the either the personal vocabulary of user B or the personal vocabulary of user C depending on the context of the speech as determined by the decoder 10. In some scenarios, the decoder 10 may use both the vocabularies of users B and C in deriving the language model used in decoding user A's speech. When the decoder 10 is converted speech to text, the decoder 10 identifies the originator of the speech and the subject matter of the speech, accesses a personal vocabulary of another user that has previously communicated with the speaker on the subject matter, and derives a language model for the speaker based on the personal vocabulary of the other user. In this example, vocabulary from a connected user, but not for a common subject matter, is not included.

The social networking connection trigger may be an interaction in a social networking service. Social networking services may be profile based, in which users create a profile as representations of themselves. The profiles often include photographs, likes and dislikes, and other user generated content. Many profiles also include a contact list used to connect to other users' profiles and access the other users' content. Profile based social network services focus on the relationships among people, which includes groups of people who share interests or are friends for any reason. Most profile based social network services are accessed via the Internet using a URL. Examples of profile based social networks include LinkedIn, Facebook, MySpace, and Bebo. The interaction that may be used to trigger a connection in a speech recognition system may be when two users are friends, belong to the same fan group, or belong to the same interest group.

In a similar manner, social network services that are microblogs may also be used to trigger a connection in a speech recognition system. Examples of microblogs include Twitter and Tumblr. The act of one user subscribing to or "following" another user on a microblog such as Twitter may trigger a connection in a speech recognition system. Alternatively or in addition, a friendship listed in a microblog service may be user to trigger the connection.

The connections among users in social network services often translate to similarities in personal vocabularies. For example, two people who were raised in the same area often have similar dialects and speech patterns and are likely to have a connection in a social networking service. Even if the two people now live on opposite sides of the world, the connection in the social networking service may be used to identify the likelihood that their personal vocabularies are similar. Accordingly, a language model of one of the users may be based on the personal vocabulary of the other.

A social network service that is also business oriented, such as LinkedIn, may also group people that have similar personal vocabularies. Often, business oriented social network services allows a user to maintain a list of contact details of people the user knows and trusts in business and maintain a profile of the user's own business experience. Business associates often use similar vocabularies.

Figure 5:
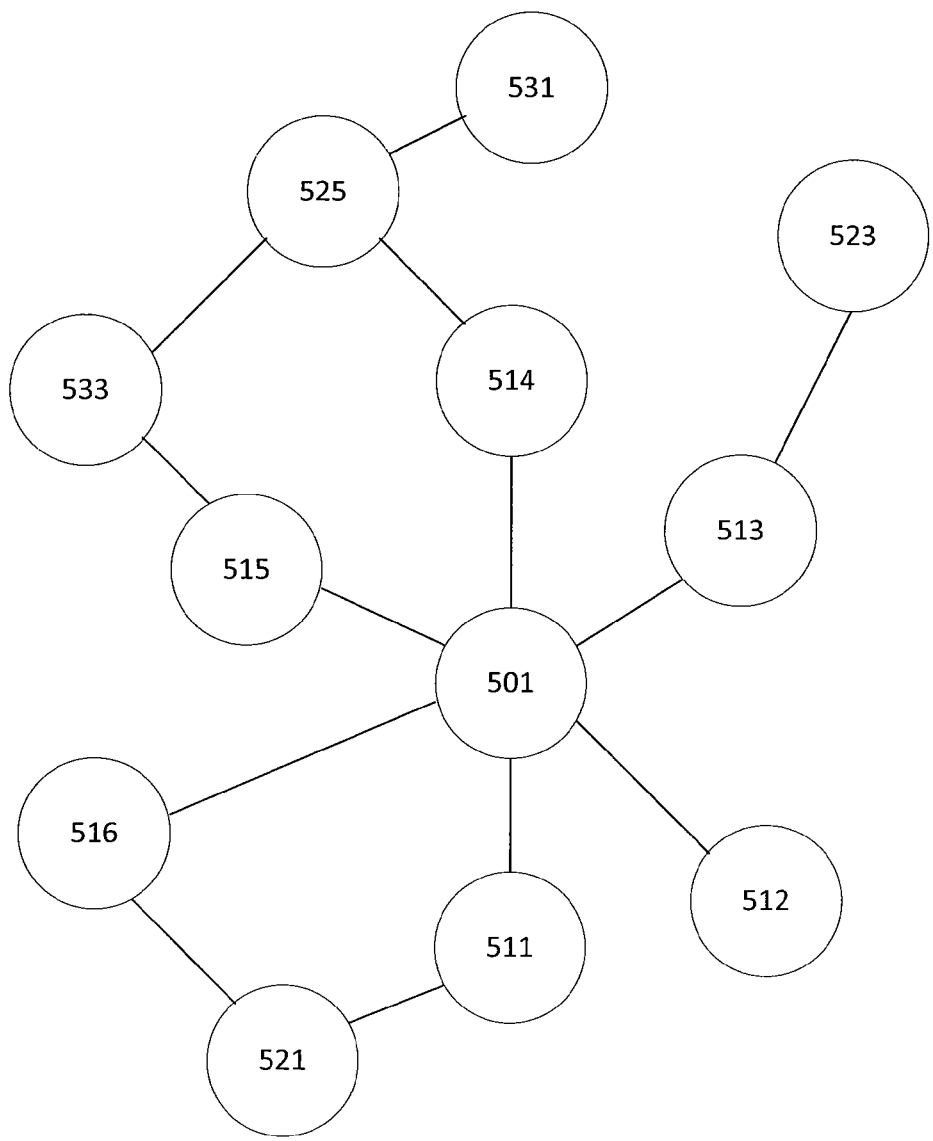
FIG. 5 illustrates an example social graph used by the speech recognition system.

These connections from email, phone calls, or social networking services may be used to generate a social graph. A social graph illustrates the connections between users. FIG. 5 illustrates a social graph 500 including several nodes. The various nodes correspond to different users or endpoints. The social graph 500 may be viewed from the perspective of node 501. The direct connections to node 501 illustrate the "friends" of node 501 or the first level of the social graph of node 501. The first level of the social graph of node 501 includes nodes 511-516. The indirect connections to node 501 or second level of the social graph of node 501 includes nodes 521, 523, 525, and 533. The third level of the social graph of node 501 includes nodes 531 and 533. Node 533 is in both the second level and third level of the social graph of node 501.

The decoder 10 may dynamically change the language model that is used. For example, when converting the speech of endpoint 20a, the controller 13 may calculate a confidence score of the converted text. The confidence score provides an indication of how likely the text converted by the language model is accurate. The confidence score may be represented as a percentage or a z-score. In addition, the confidence scores may be calculated by decoder 10 on phonetic, word, or utterance levels The confidence score is measured from the probabilities that the converted text is accurate, which is known even if the actual text cannot be known. If the confidence score exceeds a predetermined threshold, the language model is not changed. For example, the decoder 10 may convert the speech of endpoint 20a using a language model derived from only the personal vocabulary of endpoint 20a. If the confidence interval does not exceed the predetermined threshold, the decoder 10 may switch to a new language model based on the personal vocabulary of the first user and the personal vocabulary of the second user.

The personal vocabularies of additional users may be added or removed from the language model by iteratively calculating confidence scores and comparing the confidence scores to predetermined thresholds. In this learning method, a language model may include any combination of the personal vocabularies of the user's social graph, and the language models may be specified for particular subject matter. For example, referring back to FIG. 5, the language model for decoding speech from the user of node 501 for legal topics may include the personal vocabularies of nodes 511, 521, and 516 and the language model for decoding speech from the user of node 501 for basketball may include the personal vocabularies of nodes 525 and 512. Alternatively, the original language model may be a global language model derived from the personal vocabularies of all endpoints 20a-f or derived from all known personal vocabularies.

As an alternative to finding a first sufficient language model, different language models may be attempted and the model with the highest confidence score selected. Other criteria for including or not the vocabularies of other users or parts of the vocabularies for other users may be used. For example, the language model is being used for a particular conference call. The language model incorporates the vocabularies of other members of the conference call as a first approach, other first level connection with a shared subject matter relevant to the conference call, and then other criteria.

Figure 6:
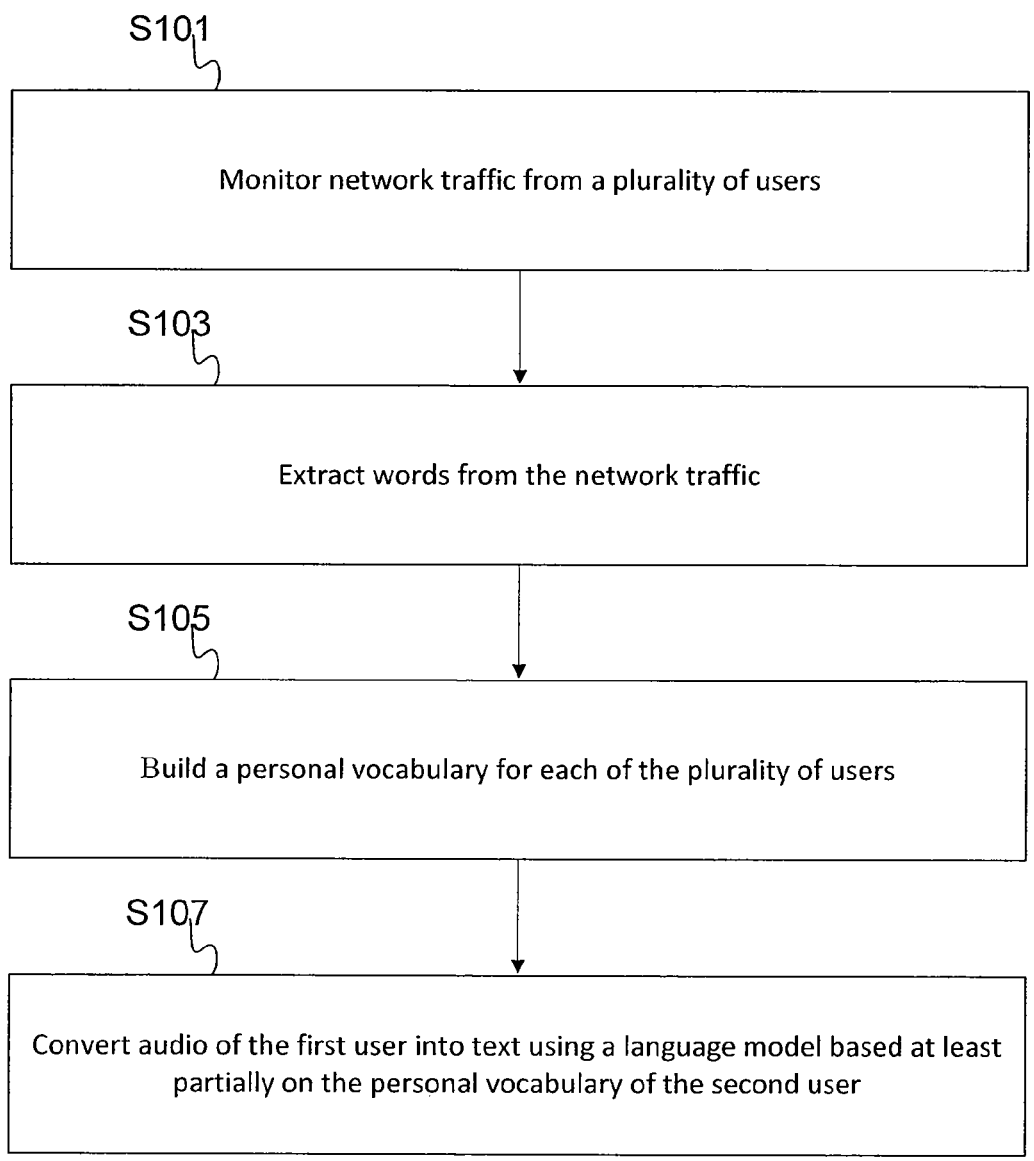
FIG. 6 illustrates a flow chart of one embodiment of a method employed by the speech recognition system.

FIG. 6 illustrates a flow chart of one embodiment of a method employed by the speech recognition system. At block S101, the collector 403 monitors network traffic from a plurality of users including a first user and a second user. At block S103, word, syllables, phonemes, or phones, are extracted words from the network traffic. The extraction may be performed by either the collector 403 or the controller 13 of decoder 10. At block S105, the controller 13 builds a personal vocabulary for each of the plurality of users from the actual text included in the network traffic. The personal vocabularies may be stored in memory 11, database 17, or at an external location. At block S107, the controller 13 converts audio of the first user into text using a language model based at least partially on the personal vocabulary of the second user. The language model includes the text of the personal vocabulary as well as the probabilities of particular n-grams occurring and the probabilities of particular sequences of n-grams.

Figure 7:
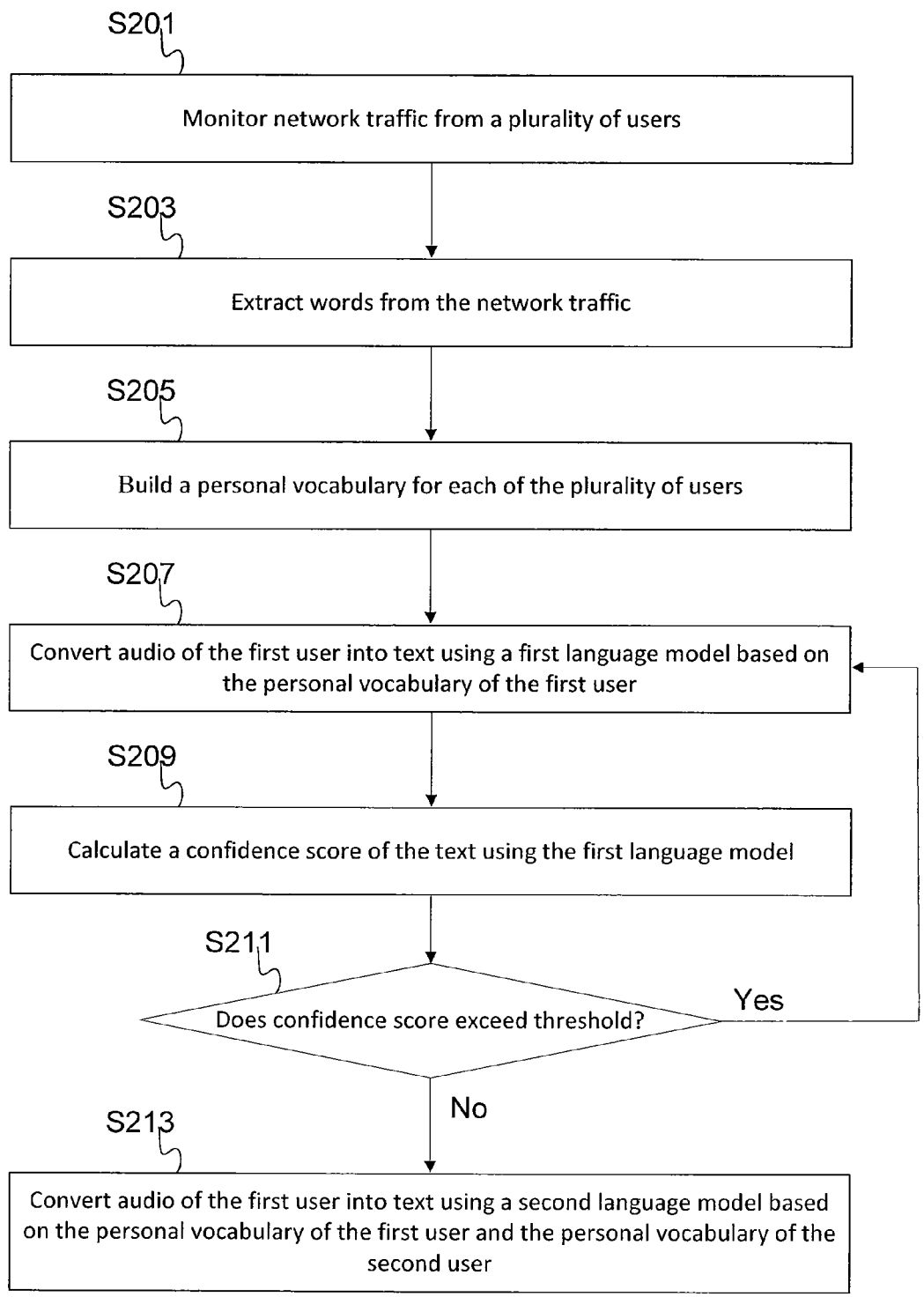
FIG. 7 illustrates a flow chart of another embodiment of a method employed by the speech recognition system.

FIG. 7 illustrates a flow chart of another embodiment of a method employed by the speech recognition system. At block S201, the collector 403 monitors network traffic from a plurality of users including a first user and a second user. At block S203, n-grams are extracted words from the network traffic. At block S205, the controller 13 builds a personal vocabulary for each of the plurality of users. At block S207, the controller 13 converts audio of the first user into text using a language model based only on the personal vocabulary of the first user. At block S209, the controller 13 tests the language model from block S207 and calculates a confidence score or confidence interval. At block S211, the controller 13 compares the confidence score to a predetermined threshold. If the confidence score exceeds the predetermined threshold, the converted text from S207 is retained. If the confidence score does not exceed the predetermined threshold, the controller 13, at block S213, converts the audio of the first user into text using a second language model based on the personal vocabulary of the first user and the personal vocabulary of the second user.

In other embodiments, the initial language model includes vocabulary from one or more other users. The conversion of audio from one or more users may be for a given call and/or may be previously collected from other calls. The language model may be created in real time with a call or created after the call has ended.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method comprising:
monitoring network traffic from a plurality of users including a first user and a second user;
extracting words from the network traffic;
building a personal vocabulary for at least the second user from the words;
identifying a connection between the first user and the second user, wherein the connection is created from a trigger that includes an email including one or more subject matter keywords and the first and the second user as one or more of a recipient of the email, a sender of the email, or a part of text in the email;
receiving audio of the first user originating from audio content that does not involve the second user; and
converting the audio of the first user into text using a language model based at least partially on the personal vocabulary of the second user and the connection between the first user and the second user, where the audio of the first user includes at least part of the one or more subject matter keywords.

2. The method of claim 1, comprising:
building a personal vocabulary for at least the first user from the words, wherein the language model is further based at least partially on the personal vocabulary of the first user.

3. The method of claim 1, wherein the connection is defined by interaction between the first user and the second user in a social networking service.

4. The method of claim 1, wherein the connection is defined by a voice over internet protocol (VoIP) phone call between the first user and the second user.

5. The method of claim 1, wherein the audio of the first user originates with an uploaded video, a teleconference, or a videoconference.

6. The method of claim 1, further comprising: saving the text in a searchable database.

7. The method of claim 1, further comprising: developing a folksonomy system based on the text.

8. The method of claim 1, where the audio content includes audio from a teleconference or a videoconference.

9. An apparatus comprising:
a collector interface configured to monitor network traffic from a plurality of users including a first user and a second user and extract n-grams from the network traffic;
a memory configured to store a personal vocabulary for at least the second user from the n-grams; and
a controller configured to:
identify a connection between the first user and the second user, wherein the connection is created from a trigger that includes a message including one or more subject matter keywords and the first and the second user as one or more of a recipient of the message, a sender of the message, or a part of a body or a header in the message;
receive audio of the first user originating from audio content that does not involve the second user; and
convert the audio of the first user into text using a language model based at least partially on the personal vocabulary of the second user and the connection between the first user and the second user, where the audio of the first user includes at least part of the one or more subject matter keywords.

10. The apparatus of claim 9, wherein the memory is further configured to store a personal vocabulary for at least the first user from the n-grams, wherein the language model is further based at least partially on the personal vocabulary of the first user.

11. The apparatus of claim 9, wherein the audio of the first user originates with an uploaded video, a teleconference, or a videoconference.

12. The apparatus of claim 9, further comprising: a database configured to store the text in a searchable format.

13. The apparatus of claim 9, wherein the n-grams are a sequence having n words, syllables, phonemes, or phones, wherein n is configurable as an integer.

14. The apparatus of claim 9, further comprising a searchable database configured to store the text.

15. The apparatus of claim 9, where the audio content includes audio from a teleconference or a videoconference.

16. Logic encoded in one or more non-transitory tangible media, the logic executable by a processor and operable to:
   monitor network traffic from a plurality of users including a first user and a second user;
   extract words from the network traffic;
   build a personal vocabulary from the words for each of the plurality of users;
   identify a connection between the first user and the second user, wherein the connection is created from a trigger that includes an email, call, or social media interaction including one or more subject matter keywords and the first and the second user as one or more of a recipient, a sender, or a part of content of the email, call, or social media interaction;
   receive audio of the first user originating from audio content that does not involve the second user; and
   convert the audio of the first user into text using a language model based on the personal vocabulary of the second user and the connection between the first user and the second user, where the audio of the first user includes at least part of the one or more subject matter keywords.

17. The logic of claim 16, further operable to: identify a connection between the first user and the second user, wherein the language model is defined by the connection.

18. The logic of claim 17, wherein the connection is defined by an email, a social networking service, or a voice over internet protocol (VoIP) phone call.

19. The logic of claim 16, further operable to: store and retrieve the text to and from a searchable database.

20. The logic of claim 16, where the audio content includes audio from a teleconference or a videoconference.

* * * * *